(12) United States Patent
Vogt et al.

(10) Patent No.: US 12,338,936 B2
(45) Date of Patent: Jun. 24, 2025

(54) LED UV SYSTEM FOR PIPE REHABILITATION

(71) Applicant: I.S.T. Innovative Sewer Technologies GmbH, Bochum (DE)

(72) Inventors: Jörg Vogt, Bochum (DE); Thomas Reutemann, Sonthofen (DE)

(73) Assignee: Trelleborg Sealing Profiles Germany GmbH, Großheubach (DE)

( * ) Notice: Subject to any disclaimer, the term of this patent is extended or adjusted under 35 U.S.C. 154(b) by 808 days.

(21) Appl. No.: 17/259,872

(22) PCT Filed: Jul. 11, 2019

(86) PCT No.: PCT/EP2019/068708
§ 371 (c)(1),
(2) Date: Jan. 12, 2021

(87) PCT Pub. No.: WO2020/011934
PCT Pub. Date: Jan. 16, 2020

(65) Prior Publication Data
US 2021/0293367 A1    Sep. 23, 2021

(30) Foreign Application Priority Data

Jul. 13, 2018 (DE) .................. 102018116978.7

(51) Int. Cl.
*F16L 55/165* (2006.01)
*B29C 35/08* (2006.01)
*B29L 23/00* (2006.01)

(52) U.S. Cl.
CPC ........ *F16L 55/165* (2013.01); *B29C 35/0805* (2013.01); *B29C 2035/0827* (2013.01); *B29L 2023/22* (2013.01)

(58) Field of Classification Search
CPC .... F16L 55/165; F16L 55/18; B29C 35/0805; B29C 2035/0827; B29L 2023/22
(Continued)

(56) References Cited

U.S. PATENT DOCUMENTS

| 5,423,630 | A  | 6/1995  | Imoto et al. |
| 10,155,328 | B2 | 12/2018 | Smith et al. |

(Continued)

FOREIGN PATENT DOCUMENTS

| CH | 676029 A5 | 11/1990 | |
| DE | 29820521 U1 * | 1/1999 | .............. F16L 55/18 |

(Continued)

OTHER PUBLICATIONS

PCT International Search Report for priority application PCT/EP2019/068708; dated Oct. 10, 2019; 6 pages.

*Primary Examiner* — Michael Maskell
(74) *Attorney, Agent, or Firm* — Adams and Reese LLP; John Henry Scott, III

(57) ABSTRACT

Device (1) for curing a plastics tube (100), which is impregnated with UV-curing synthetic resin, in a sewage pipe (101), said device comprising an elongate housing (2), the longitudinal axis of which extends in the processing direction (102) along the sewage pipe (100), and at least one light source (3) which emits UV radiation, the light source (3) being formed by at least one light-emitting diode (5) which emits UV radiation (4), wherein, in the housing (2), the at least one light-emitting diode (5) is aligned in the processing direction (102) such that the main emission direction (6) of the UV radiation emitted by the light-emitting diode (5) is oriented substantially in parallel with the longitudinal axis of the housing (2), the emitted UV radiation (4) impinging on at least one reflector (7, 8), which reflects the emitted UV radiation (4) radially with respect to the longitudinal axis of the housing (2) such that the emitted UV radiation (4)

(Continued)

Figure 1:
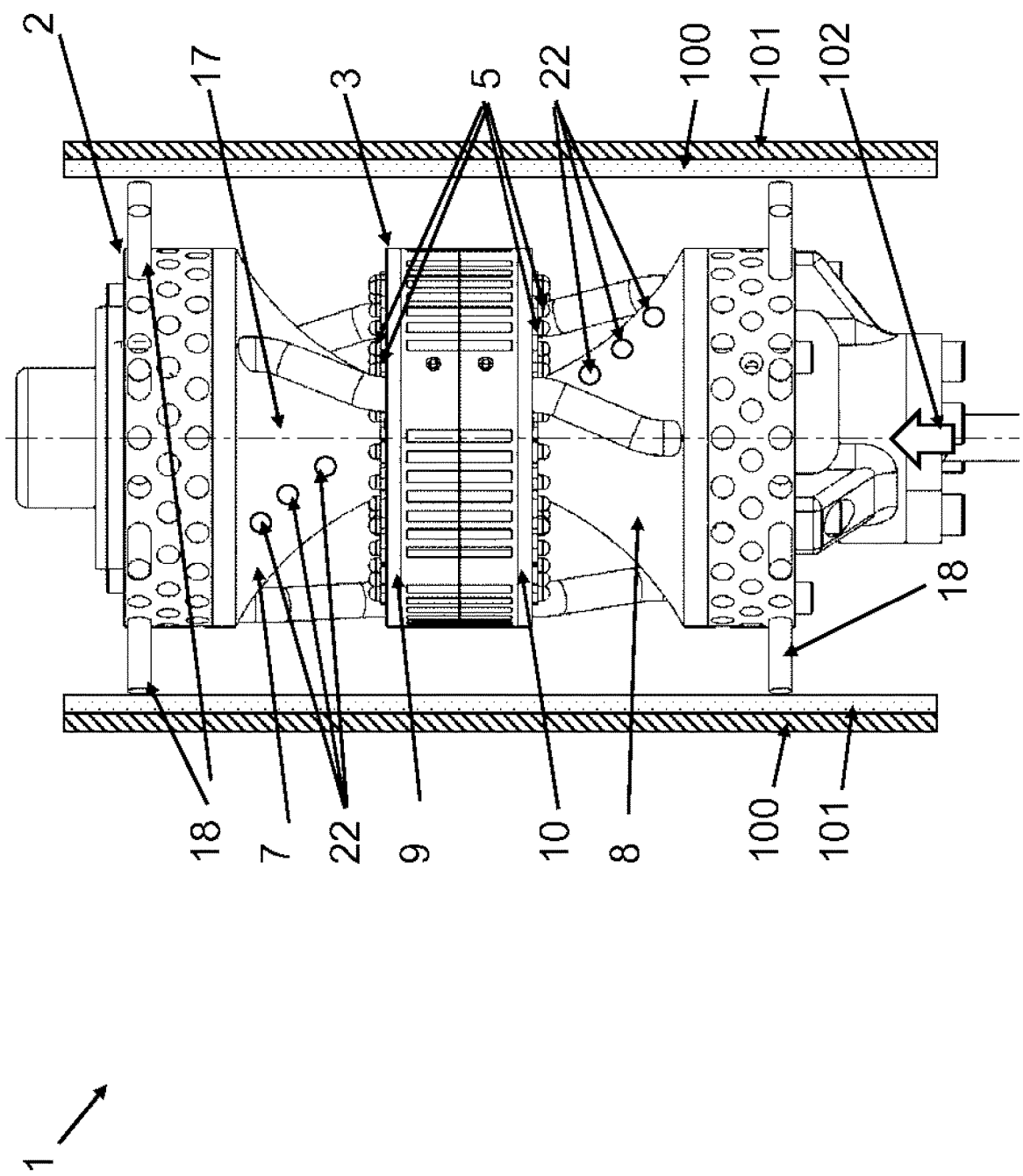

impinges on the plastics tube (100) to be cured transversely to the processing direction (102).

14 Claims, 7 Drawing Sheets

(58) Field of Classification Search
USPC .............................. 250/492.1, 455.11, 504 R
See application file for complete search history.

(56) References Cited

U.S. PATENT DOCUMENTS

| | | | |
|---|---|---|---|
| 10,611,059 | B2 | 4/2020 | Kuzniar |
| 2018/0162017 | A1* | 6/2018 | Kuzniar ................. B29C 63/34 |
| 2018/0281241 | A1 | 10/2018 | Schropp et al. |

FOREIGN PATENT DOCUMENTS

| | | | | |
|---|---|---|---|---|
| DE | 10162857 | A1 | 7/2003 | |
| EP | 0564741 | A1 * | 10/1993 | |
| EP | 3257647 | A1 * | 12/2017 | ......... B29C 35/0805 |
| EP | 3346175 | A1 * | 7/2018 | |
| JP | 2008142996 | A | 6/2018 | |
| WO | WO-2017060523 | A1 * | 4/2017 | ......... B29C 35/0805 |

* cited by examiner

LED UV SYSTEM FOR PIPE REHABILITATION

The invention relates to a device for curing a plastics tube, which is impregnated with UV-curing synthetic resin, in a sewage pipe, said device comprising an elongate housing, the longitudinal axis of which extends in the processing direction along the sewage pipe, and with at least one light source which emits UV radiation, wherein the light source is formed by at least one light-emitting diode which emits UV radiation. The invention further relates to a system composed of a plurality of devices of this kind.

A device and a system of this kind are known from EP 2 129 956 A1.

When rehabilitating pipes or generally pipe installations such as sewers or pipelines connected to the sewage system, various methods have been developed in the past few decades in which lining tubes are used. Pipes which are leaking, worn, or poorly maintained, such as sewage pipes, are nowadays mainly rehabilitated using plastics tubes in the pipelines. The rehabilitation is carried out in order to prevent any infiltration or leakage, which may cause environmental damage. The purpose when rehabilitating pipelines is to carry out preventative maintenance and repairs in order to prevent any further damage, e.g. by liquids escaping. The rehabilitation of pipelines by using plastics tubes, known as liners, may advantageously be used in buried pipe systems, e.g. when rehabilitating sewers and/or manholes. Pipelines can also be rehabilitated above ground, e.g. to rehabilitate vertical pipes, such as process pipes, downpipes or ventilation ducts. The main advantage of using a liner in a pipeline and curing the liner is that the rehabilitation is carried out from the inside of the pipeline, and therefore access to the pipeline from the outside is not required. Therefore, it is not necessary to excavate a hole to gain external access to a pipeline that has been laid underground. The technique of rehabilitating an underground pipe by inserting a plastics tube impregnated with a resin into the pipe and applying the plastics tube to the inner surface of the pipe by applying pressure to the inside of the plastics tube and simultaneously curing the resin and thus solidifying the plastics tube has been improved over many years. For over a decade, the resin of the liner has also been cured into the pipeline using a UV radiation source.

Although the use of UV radiation reduces the energy consumption compared with the conventional technique of curing using hot water or hot steam, the frequently used UV radiators are based on vacuum tube technology and therefore, on one hand, they are rather unreliable and, on the other hand, the energy or power generated by the UV radiator varies during the short service life of the UV radiator, which makes the use of UV radiators relatively disadvantageous.

The document EP 2 129 956 A1, mentioned at the outset, proposes a device comprising light-emitting diodes that emit UV radiation and are attached to and evenly distributed over the outer wall of the housing. The even distribution of the light-emitting diodes over the outer wall of the housing attempts to achieve even irradiation of the plastics tube impregnated with UV-curing synthetic resin in a sewage pipe. However, when individual light-emitting diodes fail, even irradiation can no longer be ensured. In addition, the radiation distribution is uneven due to the main emission direction predetermined by the light-emitting diodes and the effectively irradiated surface area is limited.

The object of the invention is therefore to provide an improved device which allows for an effective, less error-prone and even irradiation of a plastics tube impregnated with UV-curing synthetic resin in a sewage pipe.

As a result of the fact that, in the housing, the at least one light-emitting diode is aligned in the processing direction such that the main emission direction of the UV radiation emitted by the light-emitting diode is oriented substantially in parallel with the longitudinal axis of the housing, the emitted UV radiation impinging on at least one reflector, which reflects the emitted UV radiation radially with respect to the longitudinal axis of the housing such that the emitted UV radiation impinges on the plastics tube to be cured transversely to the processing direction, effective and even irradiation of a plastics tube impregnated with UV-curing synthetic resin in a sewage pipe can be made possible. By aligning the light-emitting diode in the housing such that the main emission direction of the UV radiation emitted by the light-emitting diode is oriented substantially in parallel with the longitudinal axis of the housing, the radiation can be particularly effectively reflected by the reflector radially with respect to the longitudinal axis of the housing such that the emitted UV radiation evenly impinges on the plastics tube to be cured transversely to the processing direction. With the reflection by means of the reflector, particularly even radiation distribution over the surface of the plastics tube can be achieved. Using the reflector, the effectively irradiated surface area can also be enlarged. If a plurality of light-emitting diodes are aligned in the housing in this way, the failure of individual light-emitting diodes does not result in uneven irradiation of the plastics tube, since, owing to the reflection on the reflector, the entire surface of the pipe is still irradiated by the other light-emitting diodes. This provides a less error-prone device for curing a plastics tube impregnated with UV-curing synthetic resin in a sewage pipe.

Advantageous embodiments and developments of the invention result from the dependent claims. It should be noted that the features that are set out individually in the claims can also be combined with one another in any technologically viable manner, and thus demonstrate further embodiments of the invention.

According to an advantageous embodiment of the invention, it is provided that the light source comprises a plurality of light-emitting diodes arranged beside one another in a plane on a printed circuit board. By arranging a plurality of light-emitting diodes on a planar printed circuit board, production and mounting of the light source can be implemented in a particularly simple manner. In addition, the light-emitting diodes can be arranged on the printed circuit board very easily using standard production technologies, and the printed circuit board can be easily aligned in the housing as a whole such that the main emission direction of the UV radiation emitted by the light-emitting diode is oriented substantially in parallel with the longitudinal axis of the housing.

An embodiment which provides that the light source comprises a plurality of printed circuit boards is particularly preferred. Using a plurality of printed circuit boards can increase the number of light-emitting diodes and therefore the output radiated power in a simple manner.

A particularly advantageous configuration of the invention provides that at least two printed circuit boards comprising light-emitting diodes that emit UV radiation on the front side are arranged in the housing so as to be oriented towards one another on the rear side. The light-emitting diodes on two printed circuit boards oriented towards one another in this way can be particularly effectively cooled, and specifically e.g. by means of an air flow in the intermediate space between the printed circuit boards, which are arranged back to back. In addition, using the light-emitting diodes arranged on two printed circuit boards in this way, particularly effective and even irradiation of a plastics tube impregnated with UV-curing synthetic resin can be achieved in a sewage pipe.

An advantageous configuration provides that a plurality of light-emitting diodes are interconnected in groups in concentric rings. Interconnecting the light-emitting diodes in concentric rings can ensure that, if individual concentric rings fail, the whole surface of the plastics tube impregnated with UV-curing synthetic resin is still irradiated by the other rings, such that even curing is ensured.

A particularly advantageous configuration of the invention provides that the at least one reflector has a conical shape, wherein the cone axis coincides with the longitudinal axis of the housing. With the conical shape of the reflector, particularly even radiation distribution over the inner surface of the plastics tube can be achieved. The UV radiation emitted in the main emission direction of the light-emitting diodes substantially in parallel with the longitudinal axis of the housing can be particularly evenly reflected by the conical reflector radially with respect to the longitudinal axis of the housing such that the emitted UV radiation effectively impinges on the plastics tube to be cured transversely to the processing direction.

According to a preferred configuration of the invention, it is provided that the surface of the reflector has a concave curvature, such that the emitted UV radiation is focused on the surface of the plastics tube to be cured. By means of the concave curvature, the reflected UV radiation can be very effectively focused on the surface of the plastics tube to be cured, such that rapid and reliable curing is achieved during the rehabilitation by the radiation density of the surface being increased.

A particularly advantageous configuration of the invention provides that the surface of the reflector has a convex curvature, such that the emitted UV radiation is fanned out and distributed over the surface of the plastics tube to be cured. By means of the convex curvature, the reflected UV radiation can be very effectively distributed over the surface of the plastics tube to be cured, such that even and complete curing is achieved during the rehabilitation by the radiation being distributed over the surface.

An embodiment which provides that at least two reflectors are arranged in the housing is particularly advantageous. By means of the arrangement of a plurality of reflectors, the UV radiation emitted substantially in parallel with the longitudinal axis of the housing can be reflected at a plurality of points radially with respect to the longitudinal axis of the housing such that the emitted UV radiation impinges on the plastics tube to be cured at a plurality of points that are in succession in the processing direction. This improves the curing of the plastics tube by the emitted UV radiation, since a given point on the surface of the plastics tube is irradiated over a longer period of time overall.

A particularly advantageous configuration of the invention relates to the fact that at least one fan, preferably two fans, for generating a cooling-airflow for cooling the light-emitting diodes is provided in the housing. By integrating a fan in the housing, a cooling-air flow for cooling the light-emitting diodes can be generated directly in the housing.

An advantageous configuration provides that the cooling-air flow passes through the interior of at least one reflector in the direction of the longitudinal axis of the housing. In this case, the reflector is advantageously used for guiding the cooling-air flow.

A particularly advantageous configuration of the invention provides that at least one partial air flow of the cooling-air flow is conducted radially outwards along at least one rear side of a light-emitting diode or printed circuit board on which the light-emitting diode is arranged in order to cool heat sinks arranged on the rear side of the light-emitting diode or printed circuit board. A partial airflow conducted outwards in this way can cool the light-emitting diodes on the printed circuit boards in a particularly simple manner. If at least two printed circuit boards comprising light-emitting diodes that emit UV radiation on the front side are arranged in the housing so as to be oriented towards one another on the rear side comprising heat sinks, ducts can be formed through the printed circuit boards comprising the heat sinks through each of which a partial air flow can be conducted radially outwards.

An embodiment which provides that at least one Peltier element for cooling the light-emitting diodes is provided in the housing is particularly advantageous. This Peltier element is preferably arranged on the rear side of the light-emitting diodes, and particularly preferably on the rear side of the printed circuit boards, which are each equipped with light-emitting diodes. Here, the Peltier element advantageously cools the light-emitting diodes and dissipates the waste heat. To do this, the Peltier element is preferably coupled by the heat-releasing side to at least one heat sink, which is cooled in a partial airflow. Therefore, the Peltier element actively assists in the release of the waste heat from the light-emitting diode through the heat sink to the surroundings. This achieves an effective cooling of the light-emitting diodes by the cooling-air flow for cooling the light-emitting diodes in the housing. If at least two printed circuit boards comprising light-emitting diodes that emit UV radiation on the front side are arranged in the housing so as to be oriented towards one another on the rear side comprising heat sinks, Peltier elements between the printed circuit boards and the heat sinks can ensure improved cooling of the light-emitting diodes by means of the partial air flow conducted radially outwards between the printed circuit boards.

A particularly advantageous configuration of the invention provides that the light source emits UV radiation only in a spectral range having a wavelength of from 360 to 420 nm, preferably having a wavelength of from 380 to 410 nm, more preferably having a wavelength of from 390 to 400 nm. Generating UV radiation in this limited spectral range makes it possible to use fewer light-emitting diodes on the light source, meaning the power of the light source is lower, which results in less heat being generated. Nevertheless, by means of this limited spectral range, effective curing of a plastics tube, which is impregnated with UV-curing synthetic resin, in a sewage pipe can be achieved. Preferably, 16 to 18 light-emitting diodes are used on a printed circuit board, wherein each of the light-emitting diodes advantageously has a power of 3 watts. The light-emitting diodes can also be arranged so as to be clustered in groups of four.

An embodiment which provides that the device comprises at least one sensor, which is configured to detect the intensity of the UV radiation emitted by the light-emitting diode, is particularly advantageous. By sensorially detecting the UV radiation that is actually emitted by the light-emitting diode, the functioning of the light-emitting diodes can be checked and the requirements for curing the plastics tube impregnated with UV-curing synthetic resin can be monitored. The sensor may be configured as a photoresistor. Using a sensor of this kind, the operating parameters of the light-emitting diodes can be checked in a simple manner. Preferably, the device comprises a plurality of sensors of this kind, such that the sensory detection of the intensity of all the light-emitting diodes can be ensured.

Furthermore, the subject-matter of the invention relates to a system comprising at least two of the devices that are described above and in the following, wherein the individual devices of the system are coupled in succession in the processing direction by means of ball joints. By coupling a plurality of devices to form a system, particularly effective curing of a plastics tube, which is impregnated with UV-curing synthetic resin, in a sewage pipe can be achieved. By means of a plurality of devices coupled in succession, the system can be guided more rapidly in the processing direction through the plastics tube in the sewage pipe during the curing.

Figure 2:
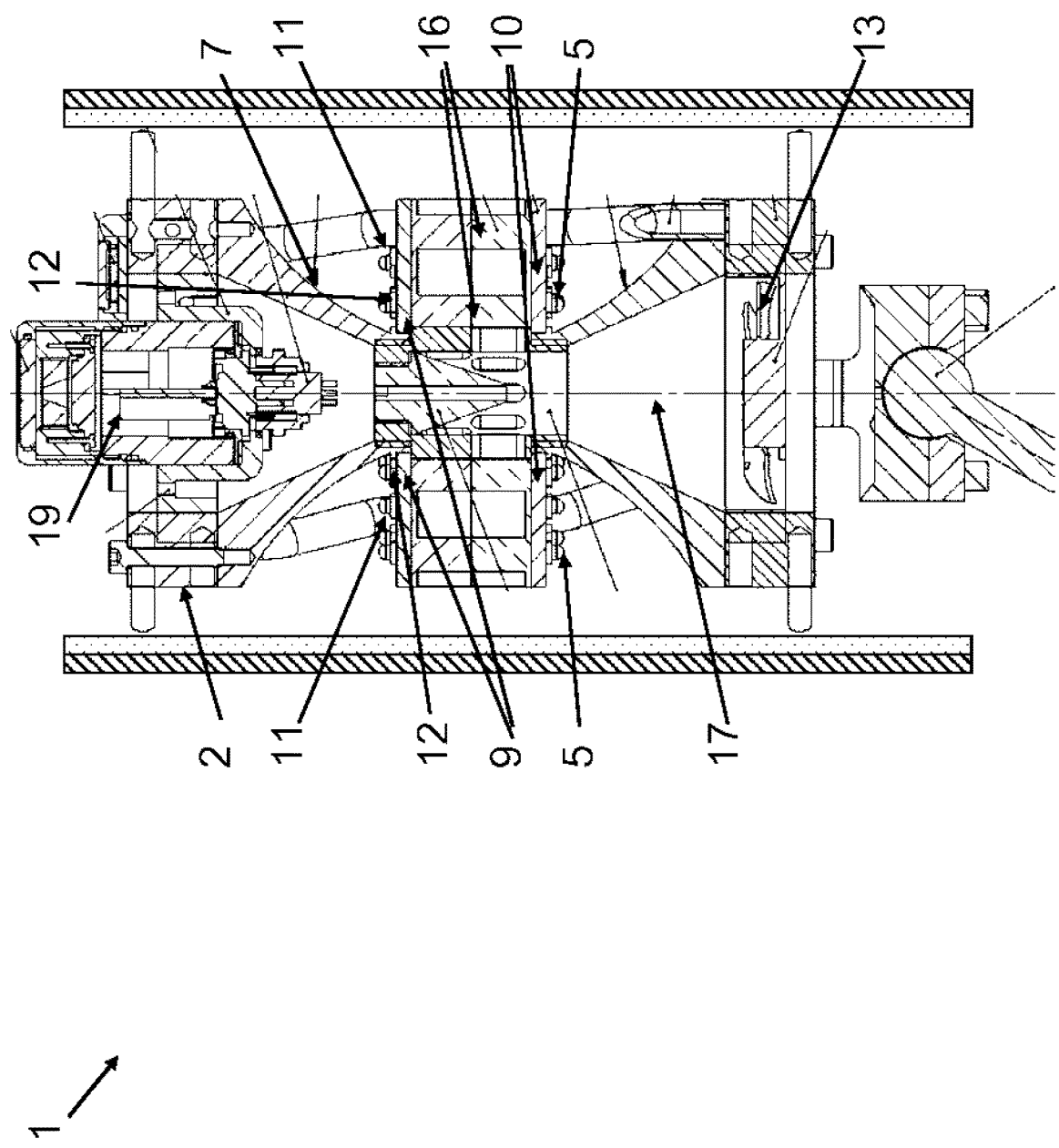
Figure 3:
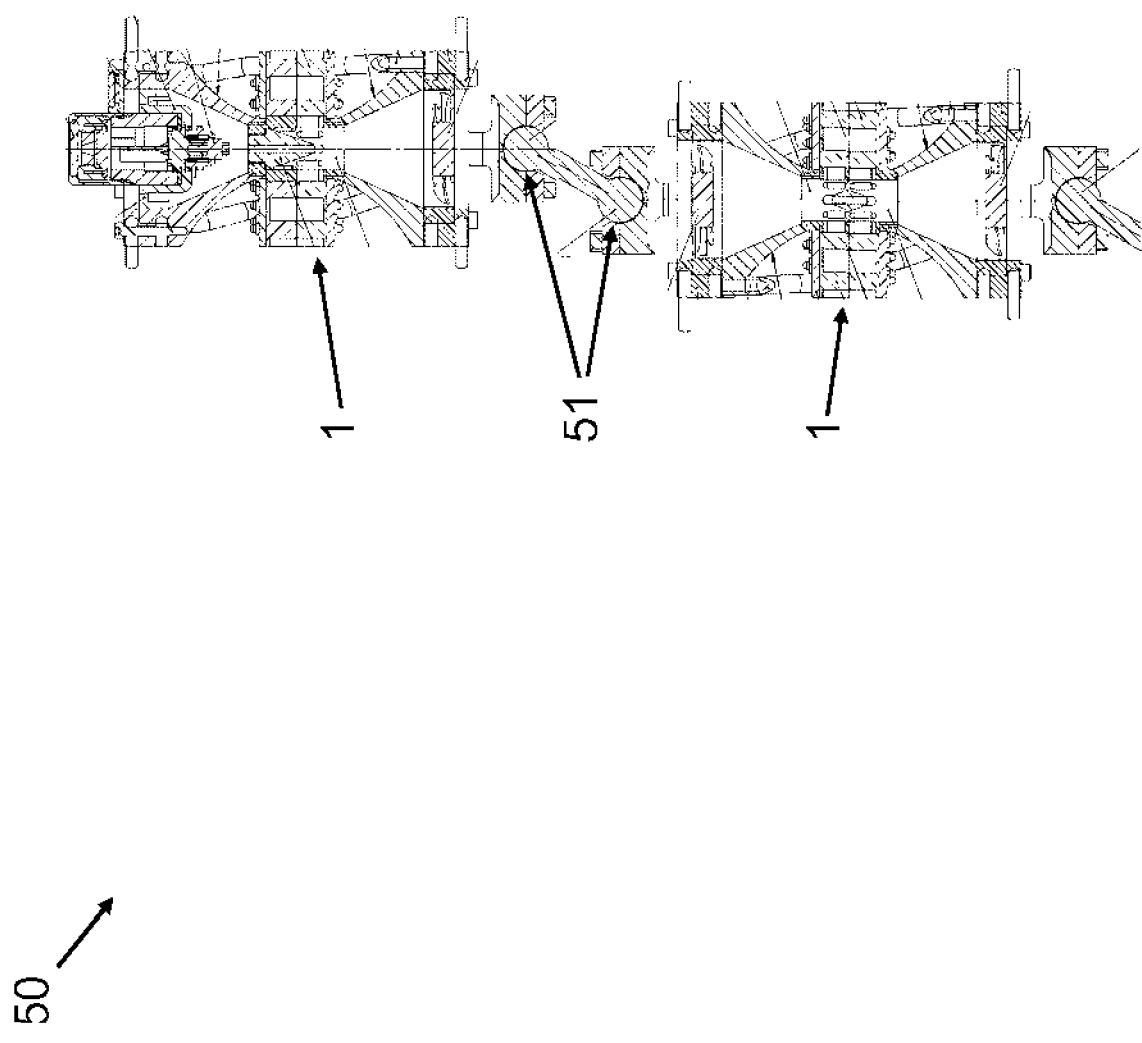
Figure 4:
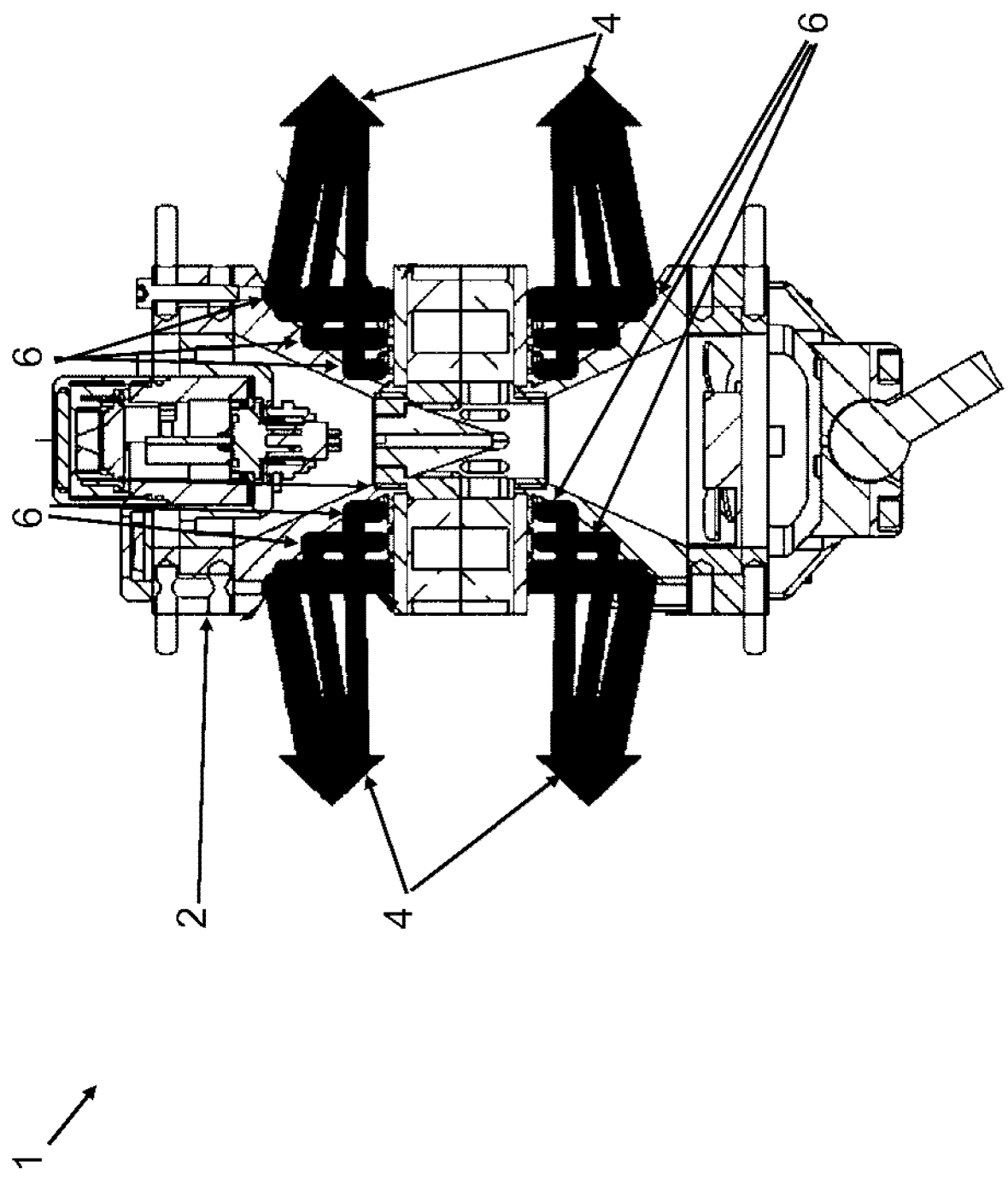
Figure 5:
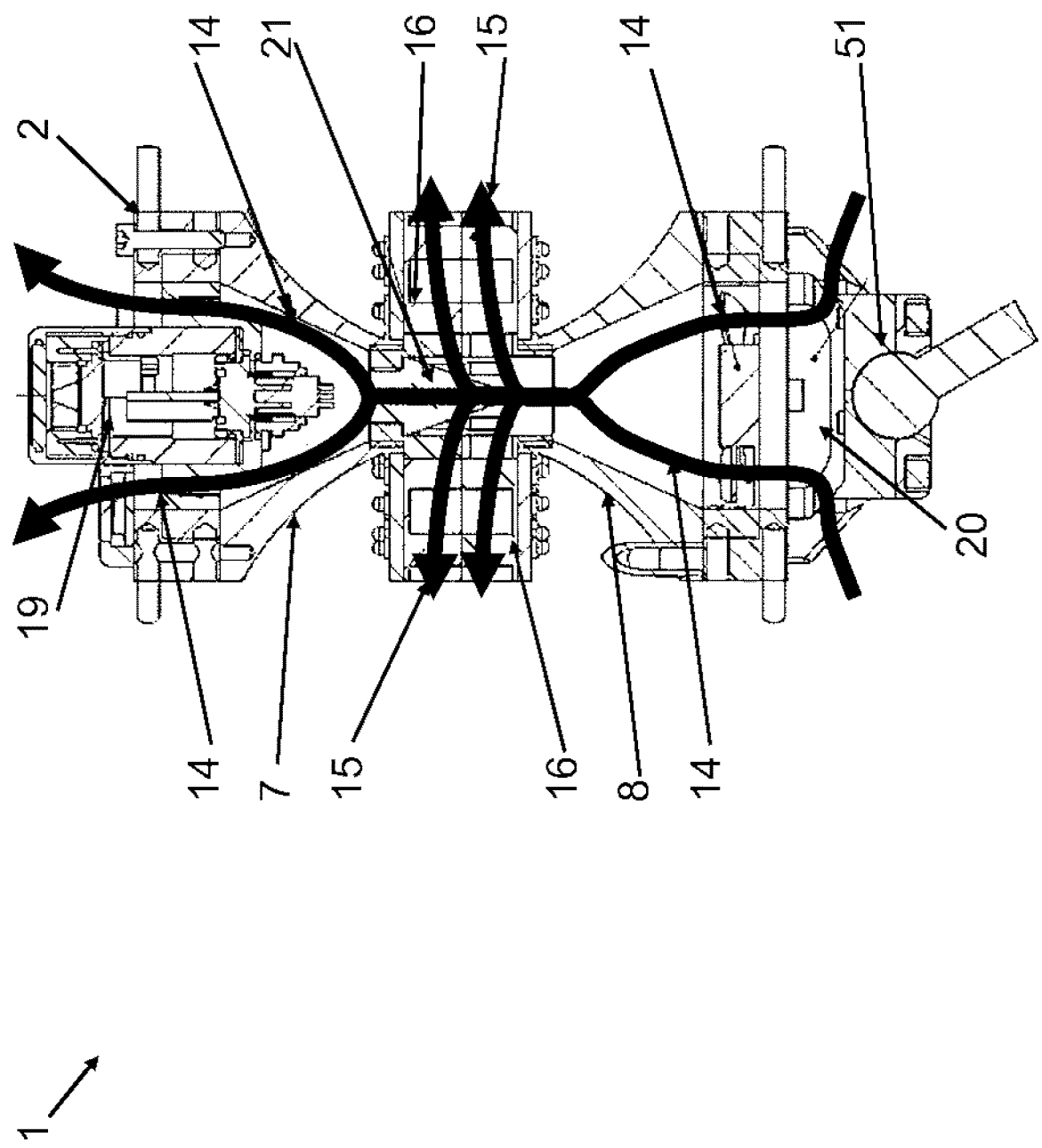
Figure 6:
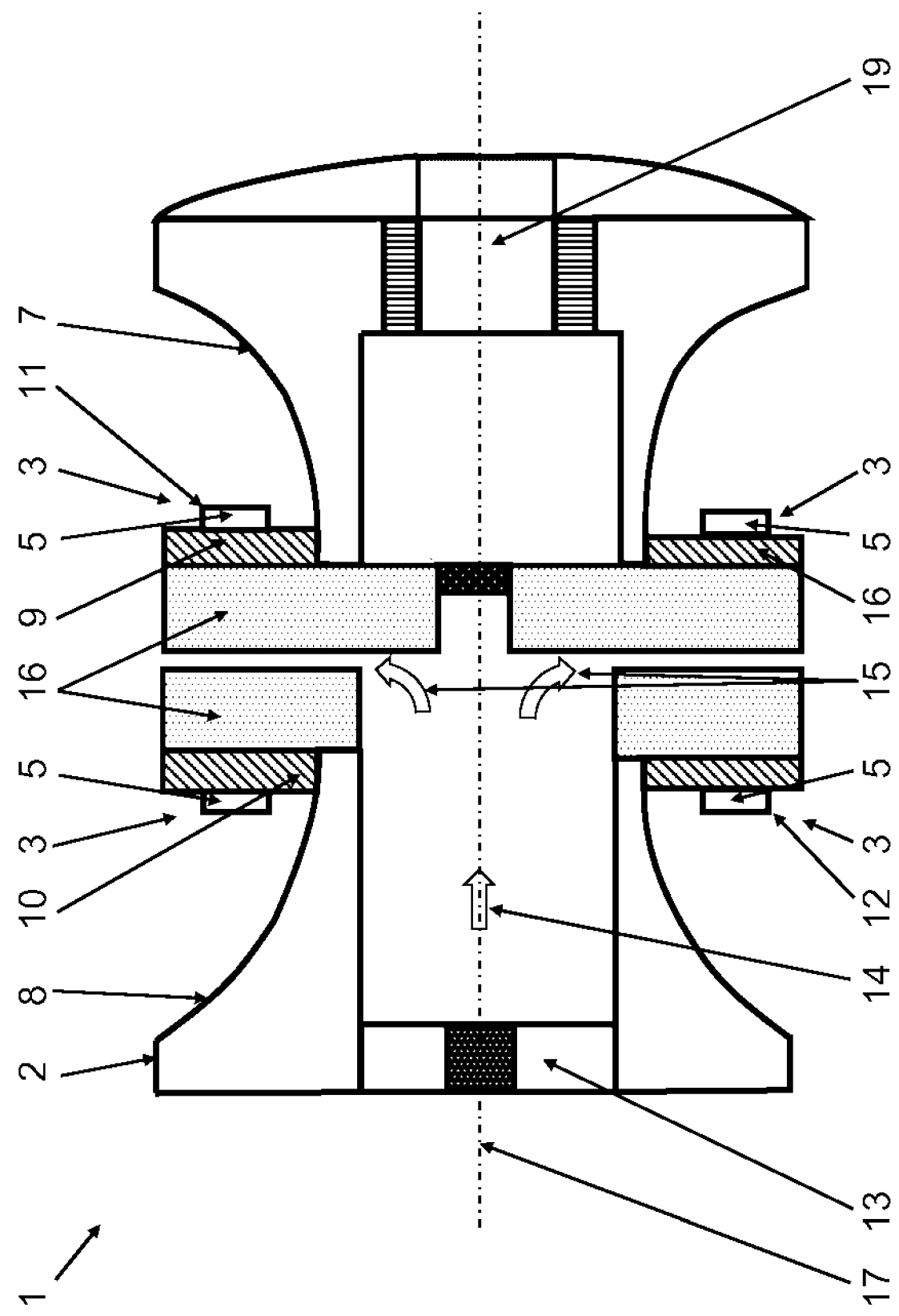
Figure 7:
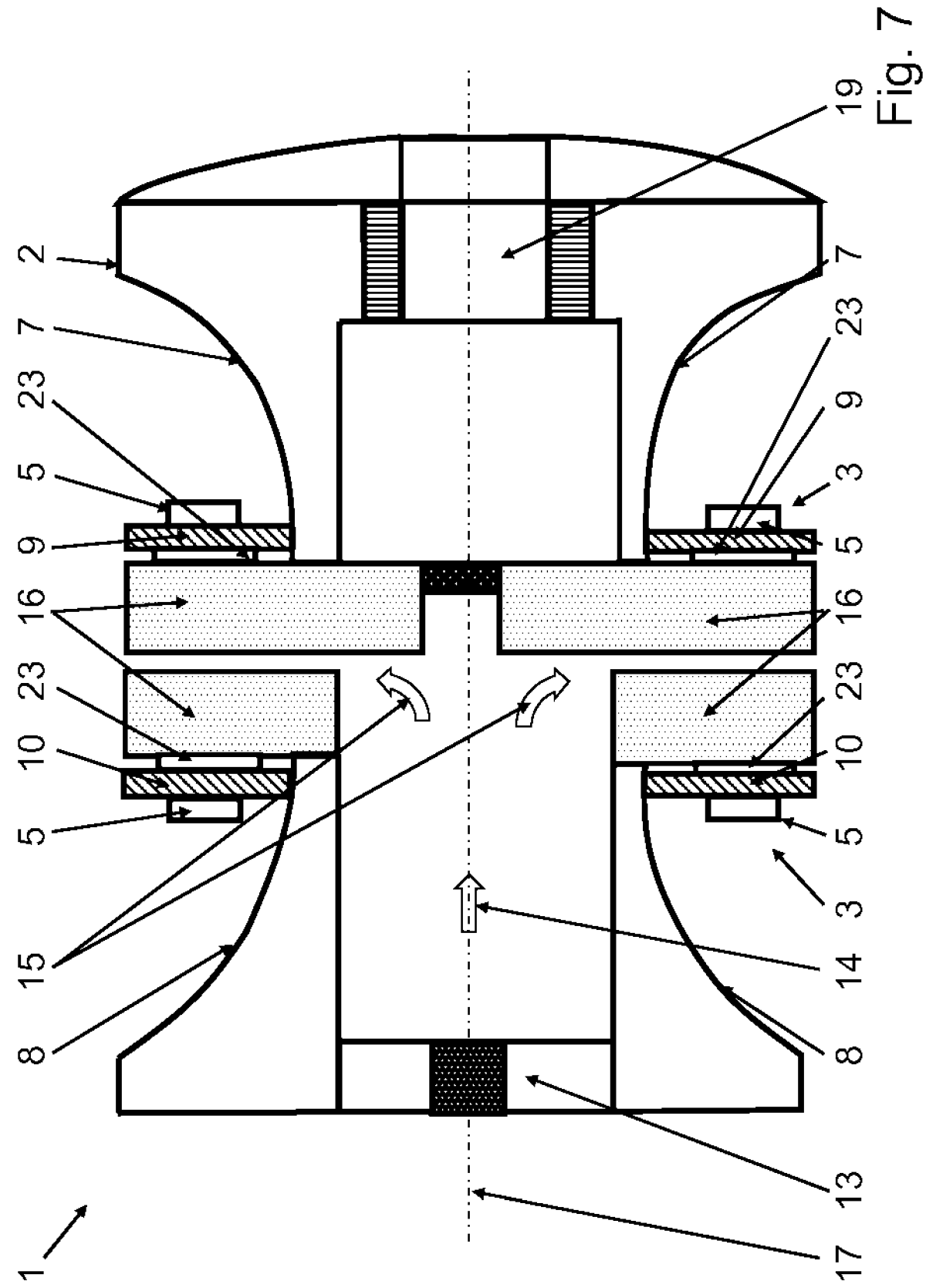

Further features, details and advantages of the invention will become apparent from the following description and with reference to the drawings, which show exemplary embodiments of the invention. Objects or elements that correspond to one another are indicated with the same reference characters in all the figures. Shown are in:

FIG. 1 a device according to the invention,
FIG. 2 a sectional view through the device,
FIG. 3 a system according to the invention,
FIG. 4 an illustration of the reflection of the radiation,
FIG. 5 an illustration of the cooling-air flow through the device,
FIG. 6 another device according to the invention,
FIG. 7 a device according to the invention.

In FIG. 1, a device according to the invention is denoted by reference character 1. The device 1 is suitable for curing a plastics tube 100, which is impregnated with UV-curing synthetic resin, in a sewage pipe 101. FIGS. 1 and 2 schematically show a sectional view of the sewage pipe 101 and the plastics tube 100 applied to the wall of the sewage pipe. The elongate sewage pipe predetermines the processing direction 102 in which the device 1 is guided through the sewage pipe 101 for curing the plastics tube 100 on the pipe wall. The processing direction 102 extends in parallel with the longitudinal axis of the pipe 101. Spacers, preferably in the form of bristles 18, and alternatively in the form of runners or wheels, which guide the housing 2 of the device 1 in the sewage pipe 101, are arranged on the elongate housing 2, the longitudinal axis 17 of which extends in the processing direction 102 along the sewage pipe 101. The device 1 has a light source 3 which emits UV radiation 4 (FIG. 4) and is formed by light-emitting diodes 5 which emit UV radiation 4 (FIG. 4). In the housing 2, the light-emitting diodes 5 are aligned such that the main emission direction 6 (FIG. 4) of the UV radiation 4 (FIG. 4) emitted by the light-emitting diodes 5 is oriented substantially in parallel with the longitudinal axis 17 of the housing 2. In this context, this essentially means that the main emission direction is oriented in parallel with the longitudinal axis 17 of the housing 2 according to the emission characteristics of the light-emitting diodes 5. The light source 3 is formed by two printed circuit boards 9, 10, which each comprise a plurality of light-emitting diodes 5 arranged beside one another in a plane on the printed circuit boards 9, 10. The light-emitting diodes 5 that emit radiation 4 (FIG. 4) are arranged on the front side of the printed circuit boards 9, 10, wherein the printed circuit boards 9, 10 are arranged in the housing 2 so as to point towards one another on the rear side. The UV radiation 4 (FIG. 4) emitted by the light-emitting diodes 5 of the two printed circuit boards 9, 10 respectively impinges on a reflector 7, 8, which reflects the emitted radiation 4 (FIG. 4) radially with respect to the longitudinal axis 17 of the housing 2 such that the emitted radiation 4 (FIG. 4) impinges on the plastics tube 100 to be cured transversely to the processing direction 102. The beam path of the UV radiation 4 (FIG. 4) emitted by the light-emitting diodes 5 is indicated in FIG. 4 and is explained in greater detail below. The reflectors 7, 8 each have a conical shape, wherein the conical shape coincides with the longitudinal axis 17 of the housing 2. The reflectors 7, 8 are arranged such that the diameter of the cone increases radially from the light source 3 along the longitudinal axis 17. The surface of the reflectors 7, 8 has a concave curvature, which results in the UV radiation 4 (FIG. 4) emitted by the light-emitting diodes 5 being focused on the surface of the plastics tube 100 to be cured. A plurality of sensors 22, which are configured to detect the intensity of the UV radiation 4 (FIG. 4) emitted by the light-emitting diodes 5, can be discerned on the surface of the reflectors 7, 8. As can be seen, the sensors 22 are distributed over the surface of the reflectors 7, 8. As a result, the UV radiation that is actually emitted by the light-emitting diodes 5 can be detected sensorially. By means of the UV radiation impinging on the sensors 22, the functioning of the light-emitting diodes 5 can be checked and the requirements for curing the plastics tube 100 impregnated with UV-curing synthetic resin can be monitored. In this way, the operating parameters of the light-emitting diodes 5 can be checked in a simple manner.

FIG. 2 is a sectional view through the device 1 according to FIG. 1. This view clearly shows that the light-emitting diodes 5 are arranged in groups in concentric rings 11, 12 around the longitudinal axis 17 of the housing 2. The light-emitting diodes 5 are interconnected in groups in these concentric rings 11, 12. Preferably, 16 to 18 light-emitting diodes are used per printed circuit board 9, 10. The light-emitting diodes can also be used in clusters of four. Furthermore, FIG. 2 clearly shows that heat sinks 16 for cooling the radiation source 3 are arranged on the rear side of the light-emitting diodes 5. A fan 13 for generating a cooling-air flow 14 (FIG. 5) for cooling the light-emitting diodes 5 is provided in the lower housing part of the housing 2. In order to achieve particularly effective cooling of the light-emitting diodes 5, air introduced into the plastics tube 100 for bringing it into contact with the sewage pipe 101 can be externally cooled. A camera module 19 is installed in the upper housing part of the housing 2, by means of which camera module the effected curing, the position of the plastics tube 100 in the sewage pipe 101 and the position of the device 1 in the sewage pipe 101 can be checked.

FIG. 3 shows a system 50 composed of a plurality of devices 1 coupled to one another in succession by means of ball joints 51 for curing a plastics tube 100, which is impregnated with UV-curing synthetic resin, in a sewage pipe 101. By means of the ball joints 51 illustrated, the devices 1 shown can be guided in succession through the plastics tube 100 impregnated with UV-curing synthetic resin in the processing direction 102 (FIGS. 1 and 2) in the sewage pipe 101 (FIGS. 1 and 2) in a manner coupled to one another, in order to together achieve the curing on the wall of the sewage pipe.

FIG. 4 shows the reflection of the UV radiation 4 emitted by the light-emitting diodes 5 on the reflectors 7, 8 (FIGS. 1 and 2). As can be seen, the UV radiation 4 emitted by the light-emitting diodes 5 (FIGS. 1 and 2) is emitted substantially in parallel with the longitudinal axis 17 of the housing 2. Therefore, the light-emitting diodes 5 (FIGS. 1 and 2) are aligned on the printed circuit boards 9, 10 (FIGS. 1 and 2) such that the main emission direction 6 extends along the longitudinal axis 17 (FIGS. 1 and 2) of the housing 2 in the processing direction 102 (FIGS. 1 and 2). As indicated in FIG. 4, the emitted UV radiation 4 impinges on the two conical reflectors 7, 8 (FIGS. 1 and 2) and is reflected radially with respect to the longitudinal axis 17 (FIGS. 1 and 2) of the housing 2 such that the emitted radiation 4 impinges on the plastics tube 100 (FIGS. 1 and 2) to be cured transversely to the processing direction 102 (FIGS. 1 and 2). By means of the convex curvature of the surface of the conical reflectors 7, 8 (FIGS. 1 and 2), the emitted UV radiation 4, as can be clearly seen in FIG. 4, is focused on the surface of the plastics tube 100 (FIGS. 1 and 2) to be cured. As a result, curing regions are formed around the reflectors in which even and effective curing of the plastics tube 100 impregnated with UV-curing synthetic resin is carried out by means of the emitted UV radiation 4 in the sewage pipe 101. FIG. 4 clearly shows that the UV radiation 4 is present in the curing regions even if individual light-emitting diodes 5 (FIGS. 1 and 2) fail or even if entire interconnected light-emitting-diode rings 5 (FIGS. 1 and 2) arranged concentrically with the longitudinal axis 17 (FIGS. 1 and 2) fail.

FIG. 5 indicates the path of the cooling-air flow 14, generated by the fan 13, through the device 1. It can be seen that the cooling-air flow 14 is conducted from the fan 13, via a suction region 20, into the interior of the lower reflector 8. The cooling-air flow 14 is channeled over the conical shape of the lower reflector 8 before the cooling-air flow 14 is split up in the region of the printed circuit boards 9, 10 (FIG. 2) into the continuing main cooling-air flow 14 and a plurality of partial air flows 15 by a distributor cone 21. The distributor cone 21, which is arranged concentrically with the longitudinal axis 17 (FIGS. 1 and 2) of the housing 2, splits the cooling-air flow 14 into a plurality of partial air flows 15 and conducts these radially outwards, such that they cool heat sinks 16 arranged on the rear sides of the light-emitting diodes 5 (FIG. 2). Splitting the cooling-air flow 14 into a plurality of partial air flows 15 thus ensures effective cooling of the light-emitting diodes 5 (FIG. 2). As can be seen, the two printed circuit boards 9, 10 (FIG. 2) form radially outwardly extending ducts for the partial air flows 15 on the rear side. The cooling-air flow 14 is additionally conducted through the interior of the upper reflector 7 further in the direction of the longitudinal axis 17 (FIG. 2) of the housing 2 and additionally cools the camera module 19 arranged therein.

FIG. 6 shows a device 1 according to the invention for curing a plastics tube 100 (FIG. 1), which is impregnated with UV-curing synthetic resin, in a sewage pipe 101 (FIG. 1). The device 1 has a light source 3 which emits UV radiation 4 (FIG. 4) and is formed by light-emitting diodes 5 which emit UV radiation 4 (FIG. 4). In the housing 2, the light-emitting diodes 5 are aligned such that the main emission direction 6 (FIG. 4) of the UV radiation 4 (FIG. 4) emitted by the light-emitting diodes 5 is oriented substantially in parallel with the longitudinal axis 17 of the housing 2. In this context, "substantially" means that the main emission direction according to the emission characteristics of the light-emitting diodes 5 is oriented in parallel with the longitudinal axis 17 of the housing 2. In this configuration, the light source 3 is also formed by two printed circuit boards 9, 10, which each comprise a plurality of light-emitting diodes 5 arranged beside one another in one plane on the printed circuit boards 9, 10. The light-emitting diodes 5 that emit radiation 4 (FIG. 4) are arranged on the front side of the printed circuit boards 9, 10, the printed circuit boards 9, 10 being arranged in the housing 2 so as to point towards one another on the rear side. The UV radiation 4 (FIG. 4) emitted by the light-emitting diodes 5 of the two printed circuit boards 9, 10 also impinges on each reflector 7, 8 here, which reflects the emitted radiation 4 (FIG. 4) radially with respect to the longitudinal axis 17 of the housing 2 such that the emitted radiation 4 (FIG. 4) impinges on the plastics tube 100 (FIG. 1) to be cured transversely to the processing direction 102. The beam path of the UV radiation 4 (FIG. 4) emitted by the light-emitting diodes 5 is indicated in FIG. 4 by way of example. The reflectors 7, 8 each form a conical shape, wherein the cone axis coincides with the longitudinal axis 17 of the housing 2. The arrangement of the reflectors 7, 8 ensures that the cone diameter increases radially from the light source 3 along the longitudinal axis 17. The surface of the reflectors 7, 8 also has a concave curvature, which focuses the UV radiation 4 (FIG. 4) emitted by the light-emitting diodes 5 on the surface of the plastics tube 100 to be cured. In this case, too, the light-emitting diodes 5 are preferably arranged in groups in concentric rings 11, 12 around the longitudinal axis 17 of the housing 2. The light-emitting diodes 5 are interconnected in groups in these concentric rings 11, 12. In a preferred configuration, 16 to 18 light-emitting diodes 5 are used per printed circuit board. The light-emitting diodes can also be used in clusters of four. Heat sinks 16 for cooling the radiation source 3 are arranged on the rear side of the printed circuit boards 9, 10. A fan 13 for generating a cooling-air flow 14 (FIG. 5) for cooling the light-emitting diodes 5 is provided in the left-hand housing part of the housing 2. The cooling-air flow 14 is split into a plurality of partial air flows 15 and is conducted radially outwards, such that the partial air flows 15 cool the heat sinks 16 arranged on the rear sides of the light-emitting diodes 5 (FIG. 2). Splitting the cooling-air flow 14 into a plurality of partial air flows 15 thus ensures effective cooling of the light-emitting diodes 5 (FIG. 2). As can be seen, the two printed circuit boards 9, 10 (FIG. 2) form radially outwardly extending ducts for the partial air flows 15 on the rear side. Particularly effective cooling of the light-emitting diodes 5 is achieved by the air introduced into the plastics tube 100 for bringing it into contact with the sewage pipe 101 being externally cooled. A camera module 19 is installed in the right-hand housing part of the housing 2, by means of which camera module the effected curing, the position of the plastics tube 100 in the sewage pipe 101 and the position of the device 1 in the sewage pipe 101 can be checked.

FIG. 7 shows a device 1 according to the invention for curing a plastics tube 100 (FIG. 1), which is impregnated with UV-curing synthetic resin, in a sewage pipe 101 (FIG. 1). By contrast with the configuration according to FIG. 6, Peltier elements 23 are arranged between the printed circuit boards 9, 10, equipped with light-emitting diodes 5, and the heat sinks 16. The Peltier elements 23 are arranged on the rear side of the printed circuit boards 9, 10 equipped with light-emitting diodes 5. As a result, the Peltier elements 23 cool the light-emitting diodes 5 and dissipate the waste heat to the coupled heat sinks 16. As a result, the Peltier elements 23 actively assist in the release of the waste heat from the light-emitting diodes 5 through the heat sink 16 to the surroundings. Effective cooling of the light-emitting diodes 5 by the cooling-air flow 14 for cooling the light-emitting diodes 5 is thus achieved in the housing 2. The rear-side heat sinks 16, which, by means of the Peltier elements 23 between the printed circuit boards 9, 10 and the heat sinks 16, ensure improved cooling of the light-emitting diodes 5 by means of the partial air flow 15 conducted radially outwards between the printed circuit boards 9, 10, are arranged between the two printed circuit boards 9, 10 comprising light-emitting diodes 5 that emit UV radiation on the front side in the housing 2.

LIST OF REFERENCE CHARACTERS

1 device
2 housing
3 light source
4 UV radiation
5 light-emitting diode
6 main emission direction
7 reflector A
8 reflector B
9 printed circuit board A
10 printed circuit board B
11 ring A
12 ring B
13 fan
14 cooling-air flow
15 partial air flow
16 heat sink
17 longitudinal axis
18 bristles
19 camera module
20 suction region
21 distributor cone
22 sensor
23 Peltier element
50 system
51 ball joints
100 plastics tube
101 sewage pipe
102 processing direction

The invention claimed is:

1. A device for curing a plastics tube, which is impregnated with UV-curing synthetic resin, in a sewage pipe, the device comprising
    an elongate housing, the longitudinal axis of which extends in the processing direction along the sewage pipe, and
    at least one light source which emits UV radiation, wherein the light source is formed by at least one light-emitting diode which emits UV radiation,
    wherein, in the housing, the at least one light-emitting diode is aligned in the processing direction such that the main emission direction of the UV radiation emitted by the light-emitting diode is oriented substantially in parallel with the longitudinal axis of the housing, wherein the emitted UV radiation impinges on at least one reflector, which reflects the emitted UV radiation radially with respect to the longitudinal axis of the housing such that the emitted UV radiation impinges on the plastics tube to be cured transversely to the processing direction,
    wherein at least two printed circuit boards comprising light-emitting diodes that emit UV radiation on the front side are arranged in the housing so as to be oriented towards one another on the rear side.

2. The device of claim 1, wherein the light source comprises a plurality of light-emitting diodes arranged beside one another in a plane on a printed circuit board.

3. The device of claim 2, wherein the light source comprises a plurality of printed circuit boards.

4. The device of claim 1, wherein a plurality of light-emitting diodes are interconnected in groups in concentric rings.

5. The device of claim 1, wherein the at least one reflector has a conical shape, and wherein the cone axis coincides with the longitudinal axis of the housing.

6. The device of claim 1, wherein the surface of the reflector has a concave curvature, such that the emitted UV radiation is focused on the surface of the plastics tube to be cured.

7. The device of claim 1, wherein at least two reflectors are arranged in the housing.

8. The device of claim 1, wherein at least one fan for generating a cooling-air flow for cooling the light-emitting diodes is provided in the housing.

9. The device of claim 8, wherein the cooling-air flow passes through the interior of at least one reflector in the direction of the longitudinal axis of the housing.

10. The device of claim 8, wherein at least one partial air flow of the cooling-air flow is conducted radially outwards along at least one rear side of a light-emitting diode or printed circuit board in order to cool heat sinks arranged on the rear side of the light-emitting diode or printed circuit board.

11. The device of claim 1, wherein at least one Peltier element for cooling the light-emitting diodes is provided in the housing.

12. The device of claim 1, wherein the light source emits UV radiation only in a spectral range having a wavelength from 395 to 400 nm.

13. The device of claim 1, wherein the device comprises at least one sensor, which is designed to detect the intensity of the UV radiation emitted by the light-emitting diode.

14. A system comprising at least two devices according to claim 1, wherein the individual devices of the system are coupled in succession in a processing direction by means of ball joints.

* * * * *